United States Patent
Oh et al.

(10) Patent No.: US 9,864,484 B2
(45) Date of Patent: Jan. 9, 2018

(54) BLIND CONTROL SYSTEM FOR A VEHICLE

(71) Applicant: Hyundai Motor Company, Seoul (KR)

(72) Inventors: Jongmin Oh, Ulsan (KR); Gi Beom Hong, Bucheon-si (KR); Jungsang Min, Seoul (KR); Seok Young Youn, Seoul (KR)

(73) Assignee: Hyundai Motor Company, Seoul (KR)

( * ) Notice: Subject to any disclaimer, the term of this patent is extended or adjusted under 35 U.S.C. 154(b) by 275 days.

(21) Appl. No.: 14/490,528

(22) Filed: Sep. 18, 2014

(65) Prior Publication Data

US 2015/0135079 A1 May 14, 2015

(30) Foreign Application Priority Data

Nov. 13, 2013 (KR) .................... 10-2013-0137860

(51) Int. Cl.
| | | |
|---|---|---|
| *G06F 3/048* | (2013.01) | |
| *G06F 3/0482* | (2013.01) | |
| *B60W 50/08* | (2012.01) | |
| *G06F 3/0488* | (2013.01) | |

(52) U.S. Cl.
CPC .......... *G06F 3/0482* (2013.01); *B60W 50/08* (2013.01); *G06F 3/04883* (2013.01); *G06F 3/04886* (2013.01)

(58) Field of Classification Search
CPC ............... G06F 3/0482; G06F 3/04883; G06F 3/04886; B60W 50/08
USPC ........................................ 715/834, 828, 825
See application file for complete search history.

(56) References Cited

U.S. PATENT DOCUMENTS

| | | | |
|---|---|---|---|
| 7,567,861 B2 * | 7/2009 | Inagaki | G01C 21/3679 |
| | | | 345/30 |
| 2011/0066981 A1 * | 3/2011 | Chmielewski | G06F 3/0482 |
| | | | 715/834 |
| 2012/0271636 A1 * | 10/2012 | Fujisawa | G10L 15/22 |
| | | | 704/270 |

FOREIGN PATENT DOCUMENTS

| | | |
|---|---|---|
| JP | 2006-029917 A | 2/2006 |
| JP | 2008-065519 A | 3/2008 |
| JP | 2008-084158 A | 4/2008 |
| JP | 2011-222031 A | 11/2011 |
| KR | 10-2010-0120705 A | 11/2010 |
| KR | 10-2012-0098254 A | 9/2012 |
| KR | 10-2012-0124518 A | 11/2012 |
| KR | 10-2015-0000076 A | 1/2015 |

\* cited by examiner

*Primary Examiner* — Andrey Belousov
(74) *Attorney, Agent, or Firm* — McDermott Will & Emery LLP

(57) ABSTRACT

A blind control system for a vehicle includes a touch screen configured to detect an input operation of a user and a position of the input, output a corresponding signal, and display an operated menu item, an accelerator pedal sensor configured to detect an operation of an accelerator pedal and output a corresponding signal, a storage configured to store a non-driving mode including a plurality of set menu items, and a driving mode including a plurality of set menu items; and a controller configured to selectively execute the non-driving mode or the driving mode stored in the storage according to an input signal of the accelerator pedal sensor, execute a corresponding menu item according to an input operation of the touch screen, and a position of the input when a currently executed mode is the non-driving mode or the driving mode.

14 Claims, 4 Drawing Sheets

BLIND CONTROL SYSTEM FOR A VEHICLE

CROSS-REFERENCE TO RELATED APPLICATION

This application claims priority to and the benefit of Korean Patent Application No. 10-2013-0137860 filed in the Korean Intellectual Property Office on Nov. 13, 2013, the entire contents of which are incorporated herein by reference.

TECHNICAL FIELD

The present disclosure relates to a blind control system for a vehicle, and more particularly, to a blind control system for a vehicle, that minimizes an eye control of electronic devices of the vehicle by a driver while driving the vehicle.

BACKGROUND

A recent vehicle includes various electronic apparatuses mounted for convenience of passengers within the vehicle. For example, various electronic devices mounted in a vehicle include a navigation system, a multimedia system, and an air conditioning system.

The existing electronic devices inside the vehicle provide user interfaces through designated buttons, and a touch screen is generally used in recent days. However, based on the mounting arrangement of the electronic devices, the driver needs to check and operate the electronic devices with his/her eyes while driving, thereby reducing safe driving.

Accordingly, there is a need for a development of an interface technology for minimizing an eye control of electronic devices of a vehicle by a driver so as to enable the driver to operate the electronic device inside the vehicle without reducing driving safety and improve a driving convenience.

The above information disclosed in this Background section is only for enhancement of understanding of the background of the present disclosure and therefore it may contain information that does not form the prior art that is already known in this country to a person of ordinary skill in the art.

SUMMARY

Disclosed herein is a blind control system for controlling electronic devices in a driven vehicle, thereby minimizing a staring at the electronic devices by a driver while driving the vehicle.

In accordance with an exemplary aspect of the present disclosure, a blind control system for a vehicle includes a touch screen configured to detect an input operation of a user and a position of the input, output a corresponding signal, and display an operated menu item; an accelerator pedal sensor configured to detect an operation of an accelerator pedal and output a corresponding signal; a storage configured to store a non-driving mode including a plurality of preset menu items, and a preset input position and input operation of each menu item, and a driving mode including a plurality of preset menu items and a preset input operation of each menu item; and a controller configured to selectively execute the non-driving mode or the driving mode stored in the storage according to an input signal of the accelerator pedal sensor, execute a corresponding menu item according to the input operation of the touch screen, and the position of the input when a currently executed mode is the non-driving mode, and execute a corresponding menu item according to an input operation of the touch screen when a currently executed mode is the driving mode.

In another exemplary aspect, when the currently executed mode is the driving mode, the input operation may be at least one input of a simple touch, a horizontal drag, a vertical drag, a rotation, and a zigzag pattern on the touch screen.

In another exemplary aspect, the controller may change the currently executed mode according to a preset input operation.

In another aspect, the input operation of changing the currently executed mode may include any one of a touch on the touch screen with one or more fingers, or a gesture pinching the touch screen with a plurality of fingers.

In another aspect, the controller may execute the non-driving mode when the vehicle starts.

In another aspect, the plurality of menu items may include a plurality of pie menu items, and a plurality of sub menu items corresponding to each pie menu item.

In another aspect, the plurality of pie menu items may include a menu item of at least one of a navigation system, a multimedia system, and an air conditioning system.

In another aspect, when a currently operated mode is the driving mode, the sub menu item may be executed by at least one input operation of a simple touch, a horizontal drag, a vertical drag, a rotation, and a zigzag pattern on the touch screen.

In another aspect, when the currently operated mode is the driving mode, the controller may preset a position of the touch on the touch screen as a reference point, and activate or non-activate a corresponding pie menu item of a drag operation based on the reference point among the plurality of preset pie menu items.

In another aspect, when the plurality of pie menu items includes a navigation system, and the activated pie menu item is the navigation system, an input of the sub menu item may be an input by at least one of a simple touch, a horizontal drag, a vertical drag, and a rotation on the touch screen.

In another aspect, when the plurality of pie menu items includes a communication system, and, the activated pie menu item is the communication system, an input of the sub menu item may be an input by at least one of a simple touch, a horizontal drag, a vertical drag, and a rotation on the touch screen.

In another aspect, when the plurality of pie menu items includes an air conditioning system, and the activated pie menu item is the air conditioning system, an input of the sub menu item may be at least one input of a simple touch, a horizontal drag, a vertical drag, a rotation, and a zigzag pattern on the touch screen.

In another aspect, when the plurality of pie menu items includes an audio system, and the activated pie menu item is the audio system, an input of the sub menu item may be at least one input of a simple touch, a horizontal drag, a vertical drag, a rotation, and a zigzag pattern on the touch screen.

In another aspect, when the plurality of pie menu items includes a radio system, and the activated pie menu item is the radio system, an input of the sub menu item may be at least one input of a simple touch, a horizontal drag, a vertical drag, a rotation, and a zigzag pattern on the touch screen.

In another aspect, the blind control system may further include an output unit configured to output a currently executed corresponding menu item.

In another aspect, the output unit may be a head up display (HUD).

In another aspect, the output unit may be a speaker for outputting a voice.

According to another exemplary aspect of the present disclosure, the blind control system for the vehicle may prevent the driver's eyes from deviating from a front direction while driving, thereby improving convenience in operation of an UI during driving, and enabling the driver to safely drive the vehicle.

Figure 1:
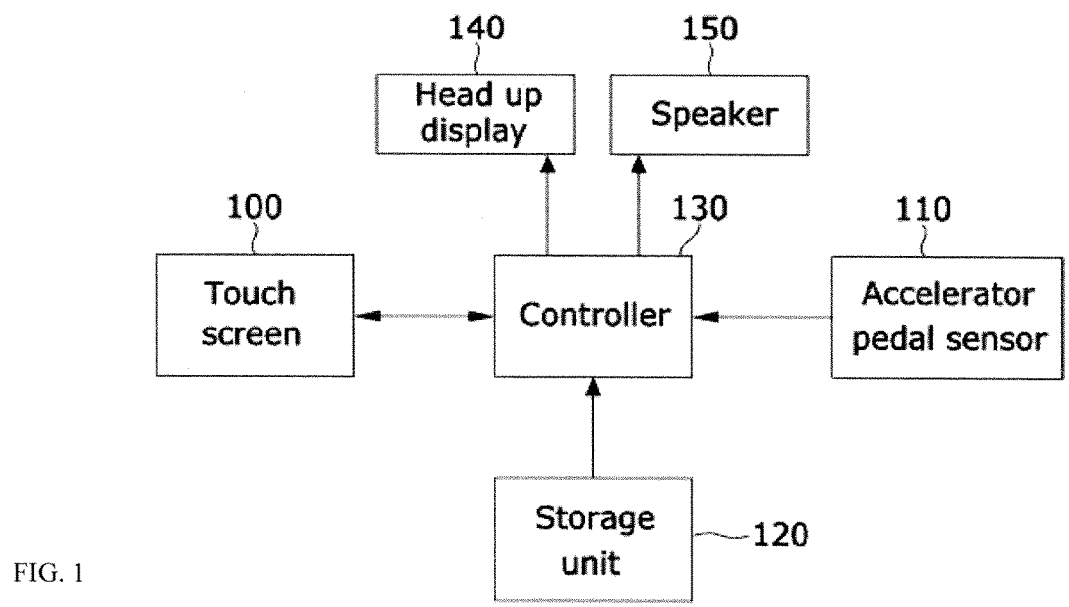
FIG. 1 is a block diagram illustrating a blind control system for a vehicle according to an exemplary aspect of the present disclosure.

| <Description of symbols> | |
|---|---|
| 100: Touch screen | 110: Accelerator pedal sensor |
| 120: Storage | 130: Controller |
| 140: Head up display | 150: Speaker |

DETAILED DESCRIPTION OF THE DRAWINGS

In the following detailed description, only certain exemplary implementations of the present disclosure have been shown and described, simply by way of illustration.

As those skilled in the art would realize, the described implementations may be modified in various different ways, all without departing from the spirit or scope of the present disclosure Like reference numerals designate like constituent elements throughout the specification.

Throughout the specification, unless explicitly described to the contrary, the word "comprise" and variations such as "comprises" or "comprising", will be understood to imply the inclusion of stated elements but not the exclusion of any other elements.

An exemplary implementation of the present disclosure will hereinafter be described in detail with reference to the accompanying drawings.

Referring to FIG. 1, the blind control system for the vehicle according to the exemplary implementation of the present disclosure includes a touch screen 100 for detecting an input operation of a user and a position of the input to output a corresponding signal, and displaying an operated menu item, an accelerator pedal sensor 110 for detecting an operation of an accelerator pedal to output a corresponding signal, a storage 120 for storing a non-driving mode including a plurality of preset menu items, and a preset input position and input operation of each menu item, and for storing a driving mode including a plurality of preset menu items, and a preset input operation of each menu item, and a controller 130 for selectively executing the non-driving mode or the driving mode stored in the storage 120 according to an input signal of the accelerator pedal sensor 110, and executing a corresponding menu item according to an input operation of the touch screen 100 and a position of the input when the currently executed mode is the non-driving mode, and executing a corresponding menu item according to an input operation of the touch screen when the currently executed mode is the driving mode.

In a situation where the vehicle does not travel, a driver may input a character to a specific region of the touch screen 100, or execute a corresponding menu item by touching a specific region.

However, during a driving of the vehicle, when the driver checks a screen of the touch screen 100, and inputs a corresponding menu item, there is a risk that an accident may incur because of a viewing deviation from a front direction of the driver's view.

Accordingly, the blind control system for the vehicle according to an exemplary implementation of the present disclosure divides an operation mode thereof into the non-driving mode and the driving mode to execute a corresponding menu item by inputting a corresponding input operation at a corresponding input position of the touch screen 100 in the non-driving mode similar to the general operation of the touch screen.

The blind control system for the vehicle according to an exemplary implementation of the present disclosure may simplify an input method in the driving mode, thereby executing a menu item, such as a multimedia player, an air conditioning device, and a navigation device, without temporarily diverting the driver's view away from the travelling direction of the driven vehicle.

That is, in the case where a currently operated mode is the driving mode, the input operation may be one or more inputs among a simple touch, a horizontal drag, a vertical drag, a rotation, and a zigzag pattern of the touch screen 100, and the blind control system may execute a corresponding menu item with a simple touch or a drag operation regardless of a specific region, thereby minimizing a disruption of the driver's attention from the driving direction.

When the engine starts up, the controller 130 presets the operation mode of the blind control system for the vehicle according to the exemplary implementation of the present disclosure to the non-driving mode, and for example, when the controller 130 determines that the vehicle is currently travelling according to a signal transmitted from the accelerator pedal sensor 110, the controller 130 switches the operation mode of the blind control system for the vehicle according to an exemplary implementation of the present disclosure to the driving mode.

Further, the controller 130 may change a currently executed mode according to a preset input operation. For example, the controller 130 may change a currently executed mode according to a set operation, such as touching the touch screen 100 with three fingers, or gesture pinching the touch screen 100 with three fingers.

The plurality of menu items may include a plurality of pie menu items, and a plurality of sub menu items corresponding to each pie menu item. The pie menu item may include a menu item of at least one of a navigation system, a multimedia system, and an air conditioning system. Moreover, the pie menu item may be defined as a higher menu item that is a combination of operation menu items of the various systems, such as the navigation system, the multimedia system, or the air conditioning system, operable by the driver. Moreover, the multimedia system means a system including a call system, a music playing device, a radio, and the like.

Figure 3:
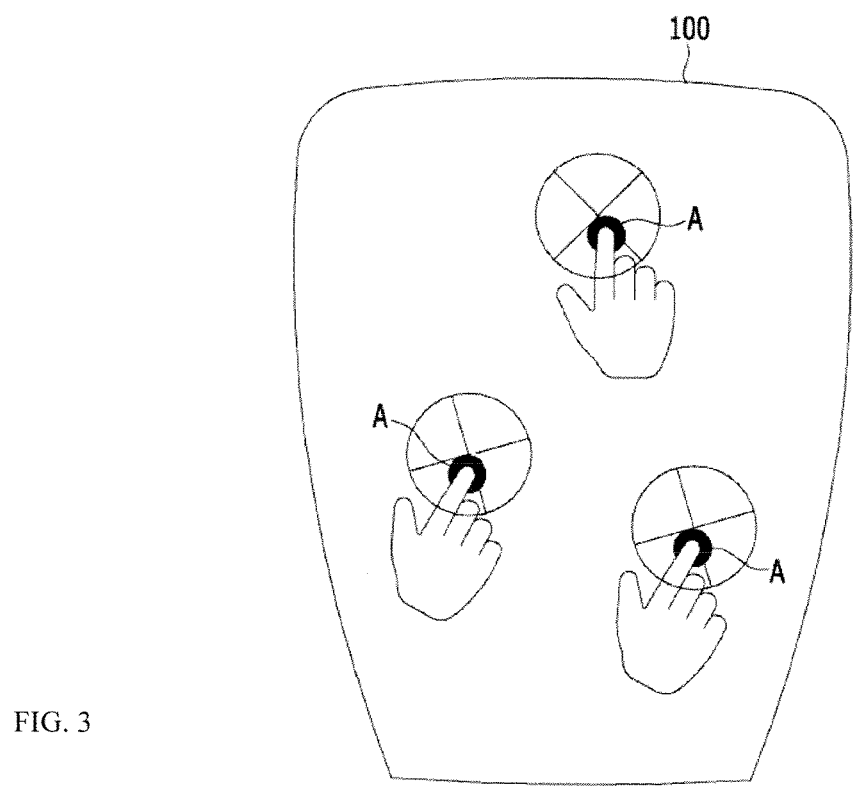
FIGS. 3 and 4 are diagrams illustrating a pie menu item input method by using the touch screen of the blind control system for the vehicle according to the exemplary aspect of the present disclosure.
Figure 4:
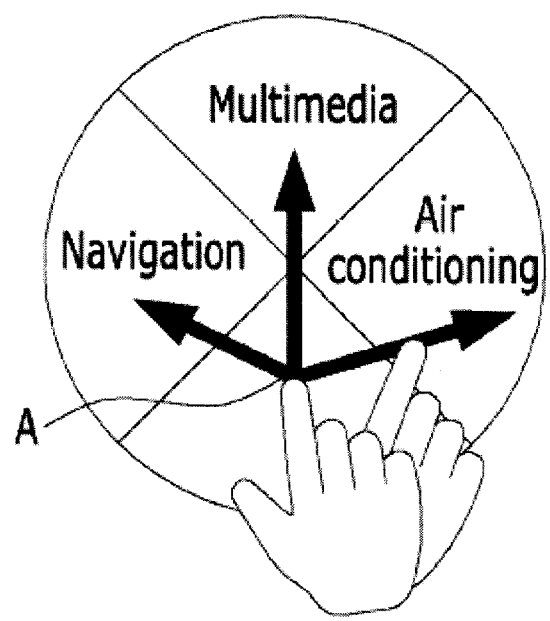

Referring to FIGS. 3 and 4, when the currently operated mode is the driving mode, a touch position of the touch screen 100 is set as a reference point A, and a corresponding pie menu item of a drag operation based on the reference point A among the plurality of set pie menu items may be activated or non-activated.

For example, the driver touches the touch screen 100 in order to execute the menu item, such as the multimedia system, the air conditioning device, or the navigation system. Then, the controller 130 generates a pie menu item that is a higher menu item based on a touch position of a finger as the reference point A. Further, the driver performs a drag operation, and the controller 130 activates or non-activates a corresponding pie menu item according to the drag operation based on the reference point A. Since the position of the touch of the touch screen by the driver serves as the reference point A, the driver may easily activate or non-activate a desired pie menu item without the disruption of his/her view towards the driving direction.

Accordingly, the driver may execute or stop a desired system even without moving his/her view away from the driving direction.

The blind control system may further include an output unit for outputting a currently executed corresponding menu item.

The output unit may output the pie menu item activated or non-activated by the controller 130 and feedback the output pie menu item to the driver, so that the driver may easily confirm the currently driven pie menu item. For example, the output unit may be a head up display 140 or a speaker 150.

FIGS. 2A-2F are diagrams, each of which illustrates a sub menu item input method using the touch screen of the blind control system for the vehicle according to the exemplary implementation of the present disclosure.

Referring to FIGS. 2A-2F, when the pie menu item is activated through the input unit 100, that is, the touch screen, the blind control system for the vehicle according to the exemplary embodiment of the present disclosure may activate a sub menu item of the corresponding pie menu item through the touch screen.

For example, as illustrated in FIG. 2A, an input of the sub menu item may be a simple touch (one time, or two times or more), a horizontal drag, a vertical drag, a rotation, and the like.

Referring to FIG. 2B, when the selected pie menu item (higher menu item) is the navigation system, the simple touch may be set to a destination guide start, the horizontal drag may be set to a search for a recent destination, the vertical drag may be set to an increase or a decrease in volume, and the rotation may be set to a re-search of a route.

Further, referring to FIG. 2C, when the selected pie menu item (higher menu item) is the call (communication) system, the simple touch or the left-directional drag may be set to call acceptance, the vertical drag may be set to an increase or a decrease in volume of the call, and the right-directional drag may be set to a rejection of the call.

Further, referring to FIG. 2D, when the selected pie menu item (higher menu item) is the air conditioning system, the simple touch may be set to turning-on or turning-off of the air conditioning system, the horizontal drag may be set to a change of an air conditioning mode, the vertical drag may be set to an increase or a decrease in a temperature, the rotation may be set to an increase or a decrease in wind strength, and a zigzag pattern may be set to a removal of frost.

Further, referring to FIG. 2E, when the selected pie menu item (higher menu item) is the audio system, the simple touch may be set to a play or a stop of a music file, the horizontal drag may be set to selection of a previous/next music file, the vertical drag may be set to an increase or a decrease in volume, and the rotation may be set to selection of a next folder.

Further, referring to FIG. 2F, when the selected pie menu item (higher menu item) is the radio system, the simple touch may be set to turning-on or turning-off of the radio system, the horizontal drag may be set to selection of a previous/next bookmark channel, the vertical drag may be set to an increase or a decrease in volume, and the rotation may be set to selection of a next channel.

Figure 2:
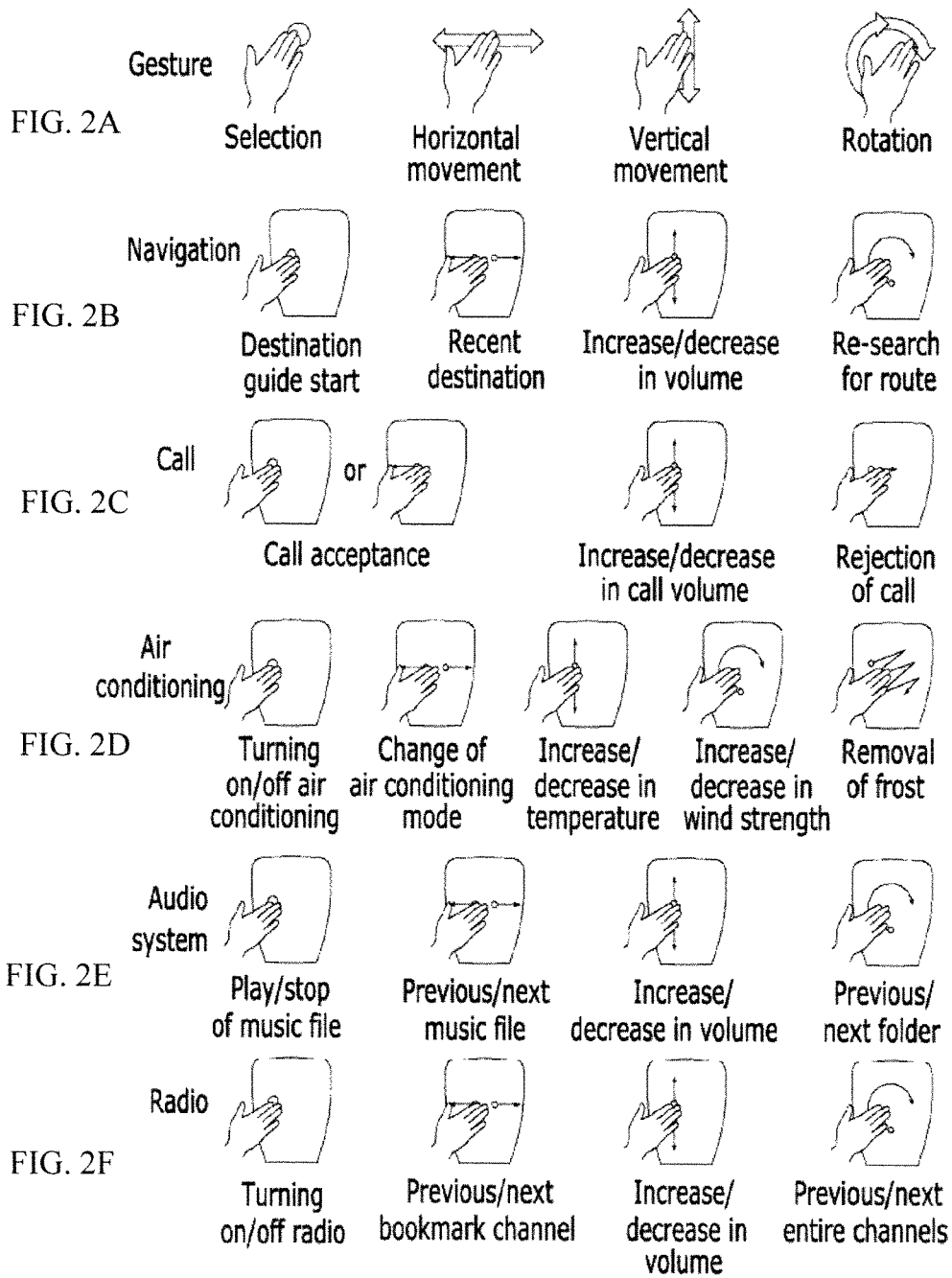
FIGS. 2A-2F are a plurality of diagrams illustrating a plurality of inputs of a plurality of sub menu items by using a touch screen of the blind control system for the vehicle according to the exemplary aspect of the present disclosure.

The execution of the sub menu item by using the touch screen has been described with reference to FIG. 2, but the present disclosure is not limited to the aforementioned examples, and convenience and safety of the driver may be promoted by setting input gestures of various forms or patterns in the various types of system.

As described above, the blind control system for the vehicle according to the exemplary implementation of the present disclosure may minimize a disruption of the driver's eyes towards the driving direction for operating the electronic devices inside the vehicle while the driver drives the vehicle, thereby promoting safe driving of the vehicle.

While this disclosure has been described in connection with what is presently considered to be practical exemplary implementations, it is to be understood that the disclosure is not limited to the disclosed implementations. On the contrary, it is intended to cover various modifications and equivalent arrangements included within the spirit and scope of the appended claims.

What is claimed is:

1. A blind control system for a vehicle, comprising:
a touch screen configured to detect an input operation of a user and a position of the input, to output a corresponding signal in response to the detected input operation, and to display an operated menu item;
an accelerator pedal sensor configured to detect an operation of an accelerator pedal and output a corresponding signal;
a storage configured to store a non-driving mode including a plurality of preset non-driving mode menu items and a preset input position and input operation of each one of the plurality of preset non-driving mode menu items, and a driving mode including a plurality of preset driving mode menu items and a preset input operation of each one of the plurality of preset driving mode menu items;
a controller configured to selectively execute the non-driving mode or the driving mode stored in the storage based on the outputted corresponding signal of the accelerator pedal sensor, execute a non-driving mode menu item in response to the detected input operation and the detected position of the input of the touch screen when a currently executed mode is the non-driving mode, and execute a driving mode menu item in response to the detected input operation of the touch screen when a currently executed mode is the driving mode,
an output unit for displaying and outputting a currently executed corresponding menu item, wherein the output unit is a head up display (HUD), and the output unit outputs the menu item activated or non-activated by the controller and feedbacks the output menu item to the user,
wherein when a currently executed mode is the driving mode, a touch position on the touch screen is set as a reference point and the driving mode menu item is generated on the reference point, and the driving mode menu item is executed by performing at least one input operation of a simple touch, a horizontal drag, a vertical drag, a rotation and a zigzag pattern on the touch screen.

2. The blind control system of claim 1, wherein:
the controller changes the currently executed mode according to the input operation.

3. The blind control system of claim 2, wherein:
the input operation of changing the currently executed mode includes any touch on the touch screen with a plurality of fingers, and a gesture pinching of the touch screen with a plurality of fingers.

4. The blind control system of claim 1, wherein:
the controller executes the non-driving mode when the vehicle starts.

5. The blind control system of claim 1, wherein:
the plurality of menu items includes a plurality of pie menu items, and a plurality of sub menu items corresponding to each one of the plurality of pie menu items.

6. The blind control system of claim 5, wherein:
the plurality of pie menu items includes a menu item of at least one of a navigation system, a multimedia system, and an air conditioning system.

7. The blind control system of claim 6, wherein:
when the currently operated mode is the driving mode, one of the plurality of sub menu items is executed by at least one input operation that corresponds to one of a simple touch, a horizontal drag, a vertical drag, a rotation, and a zigzag pattern on the touch screen.

8. The blind control system of claim 6, wherein:
when the currently operated mode is the driving mode, the controller sets a position of the touch on the touch screen as a reference point, and activates or non-activates a corresponding pie menu item of a drag operation based on the reference point among the plurality of preset pie menu items.

9. The blind control system of claim 5, wherein:
when the plurality of pie menu items includes a navigation system, and the activated pie menu item is the navigation system, an input of one of the plurality of the sub menu items is an input by at least one of a simple touch, a horizontal drag, a vertical drag, and a rotation on the touch screen.

10. The blind control system of claim 5, wherein:
when the plurality of pie menu items includes a communication system, and the activated pie menu item is the communication system, an input of one of the plurality of the sub menu s is an input by at least one of a simple touch, a horizontal drag, a vertical drag, and a rotation on the touch screen.

11. The blind control system of claim 5, wherein:
when the plurality of pie menu items includes an air conditioning system, and the activated pie menu item is the air conditioning system, an input of one of the plurality of the sub menu items is at least one input of a simple touch, a horizontal drag, a vertical drag, a rotation, and a zigzag pattern on the touch screen.

12. The blind control system of claim 5, wherein:
when the plurality of pie menu items includes an audio system, and the activated pie menu item is the audio system, an input of one of the plurality of the sub menu items is at least one input of a simple touch, a horizontal drag, a vertical drag, a rotation, and a zigzag pattern on the touch screen.

13. The blind control system of claim 5, wherein:
when the plurality of pie menu items includes a radio system, and the activated pie menu item is the radio system, an input of one of the plurality of the sub menu items is at least one input of a simple touch, a horizontal drag, a vertical drag, a rotation, and a zigzag pattern on the touch screen.

14. The blind control system of claim 1, wherein:
the output unit is a speaker for outputting a voice.

* * * * *